(12) United States Patent
Hedinger et al.

(10) Patent No.: US 9,379,980 B1
(45) Date of Patent: Jun. 28, 2016

(54) METHODS AND SYSTEMS FOR AXI ID COMPRESSION

(75) Inventors: Sam Hedinger, Austin, TX (US); Robert L. Pelt, San Jose, CA (US)

(73) Assignee: Altera Corporation, San Jose, CA (US)

(*) Notice: Subject to any disclaimer, the term of this patent is extended or adjusted under 35 U.S.C. 154(b) by 338 days.

(21) Appl. No.: 13/523,142

(22) Filed: Jun. 14, 2012

Related U.S. Application Data

(60) Provisional application No. 61/539,602, filed on Sep. 27, 2011.

(51) Int. Cl.
*G06F 13/00* (2006.01)
*H04L 12/801* (2013.01)
*G06F 13/364* (2006.01)

(52) U.S. Cl.
CPC .............. *H04L 47/10* (2013.01); *G06F 13/00* (2013.01); *G06F 13/364* (2013.01)

(58) Field of Classification Search
CPC ........ G06F 13/00; G06F 13/364; H04L 47/10
USPC ...................................... 710/106–107, 315, 9
See application file for complete search history.

(56) References Cited

U.S. PATENT DOCUMENTS

| | | | |
|---|---|---|---|
| 7,707,339 B2* | 4/2010 | Pigott et al. | 710/110 |
| 2006/0277349 A1* | 12/2006 | Murdock et al. | 710/316 |
| 2007/0067549 A1* | 3/2007 | Gehman | 710/315 |
| 2009/0228612 A1* | 9/2009 | Rai | 710/14 |
| 2011/0296066 A1* | 12/2011 | Xia | 710/110 |

\* cited by examiner

*Primary Examiner* — Tim T Vo
*Assistant Examiner* — Kim T. Huynh
(74) *Attorney, Agent, or Firm* — Fletcher Yoder, P.C.

(57) ABSTRACT

Methods and systems for AXI ID compression are disclosed. Bus transaction data and an M-bit ID associated with the bus transaction data are transmitted by a master device via a bus to an ID mapper. The ID mapper is used to select, based on the M-bit ID, an N-bit ID from a plurality of N-bit IDs, where N may be less than M. The N-bit ID is associated with the bus transaction data. The bus transaction data and the N-bit ID associated with the bus transaction data are transmitted via the bus to a slave device.

17 Claims, 5 Drawing Sheets

METHODS AND SYSTEMS FOR AXI ID COMPRESSION

CROSS-REFERENCE TO RELATED APPLICATIONS

This application claims the benefit under 35 U.S.C. §119(e) of U.S. Provisional Application No. 61/539,602 filed Sep. 27, 2011, which is hereby incorporated by reference herein in its entirety.

FIELD OF THE INVENTION

The present invention relates to methods and systems for compressing identification information used in hardware bus protocols.

BACKGROUND OF THE INVENTION

A hardware bus is a system of hardware connections that allows for data transfers between memory modules, processors, hard disk drives, and other types of devices in a hardware system. Bus protocols, such as the Advanced eXtensible Interface (AXI) protocol, manage data transfers over the bus and specify how data transactions between devices are identified and ordered. For example, in the AXI protocol, each bus transaction has an identifier (ID) value that is used to identify data, requests, responses, and acknowledgments that each may be associated with the transaction. AXI IDs used by a device are allocated a fixed number of bits by the hardware system.

In some circumstances, a bus may be used to connect two or more hardware systems that each have allocated a different number of bits for bus transaction ID values. For example, the bus may span between a Programmable Logic Device (PLD) and a processor subsystem where PLD bus transactions are allocated M bits for ID values, and processor subsystem bus transactions are allocated N bits for ID values. If M is different than N, then the bus transaction ID values used by the two hardware systems may not be compatible.

SUMMARY OF THE INVENTION

To address the above and other shortcomings within the art, the present disclosure provides systems and methods for compressing identification (ID) information used in hardware bus protocols, such as the AXI protocol. In some embodiments, identification information may be compressed by mapping, i.e. corresponding, larger identification values to smaller identification values either dynamically or in a pre-defined way.

In an embodiment, a first identifier is allocated to a second identifier associated with a bus transaction. The first identifier is selected, using an ID mapper, based on the second identifier. The first identifier is associated, using the ID mapper, with the data transmitted on the bus. The second identifier is associated, using the ID mapper, with the data received on the bus.

In some embodiments, the first identifier is an N-bit identifier, the second identifier is an M-bit identifier, and the value N is less than the value M. In some embodiments, the bus is configured to operate using the Advanced Extensible Interface (AXI) protocol. In some embodiments, the first identifier is selected, based on the second identifier, from a set of unallocated first identifiers of the plurality of first identifiers; and the first identifier is allocated to the second identifier. In some embodiments, the first identifier was previously allocated to the second identifier. In some embodiments, the first identifier is preassigned to the second identifier.

In an embodiment, a system allocates an first identifier to an second identifier associated with a read bus transaction. The read bus transaction includes a read request and read data. The system includes a bus and an ID mapper. The ID mapper is configured to receive the read request associated with the second identifier on the bus and select, based on the second identifier, the first identifier from a plurality of first identifiers. The ID mapper is also configured to associate the first identifier with the read request; receive the read data in response to the read request on the bus; and associate the second identifier with the read data.

In an embodiment, a system allocates an first identifier to an second identifier associated with a write bus transaction. The write bus transaction includes a write request, write data, and a write acknowledgment. The system includes a bus and an ID mapper. The ID mapper is configured to receive the write request on the bus and select, based on the second identifier, the first identifier from the plurality of first identifiers. The ID mapper is also configured to associate the first identifier with the write request; receive the write data on the bus; and associate the second identifier with the write data. The ID mapper is also configured to receive the write acknowledgment on the bus, and associate the second identifier with the write acknowledgment.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

To provide an overall understanding of the invention, certain illustrative embodiments will now be described. For ease of explanation, the systems and methods disclosed herein will be described in terms of the AXI protocol as an example only. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
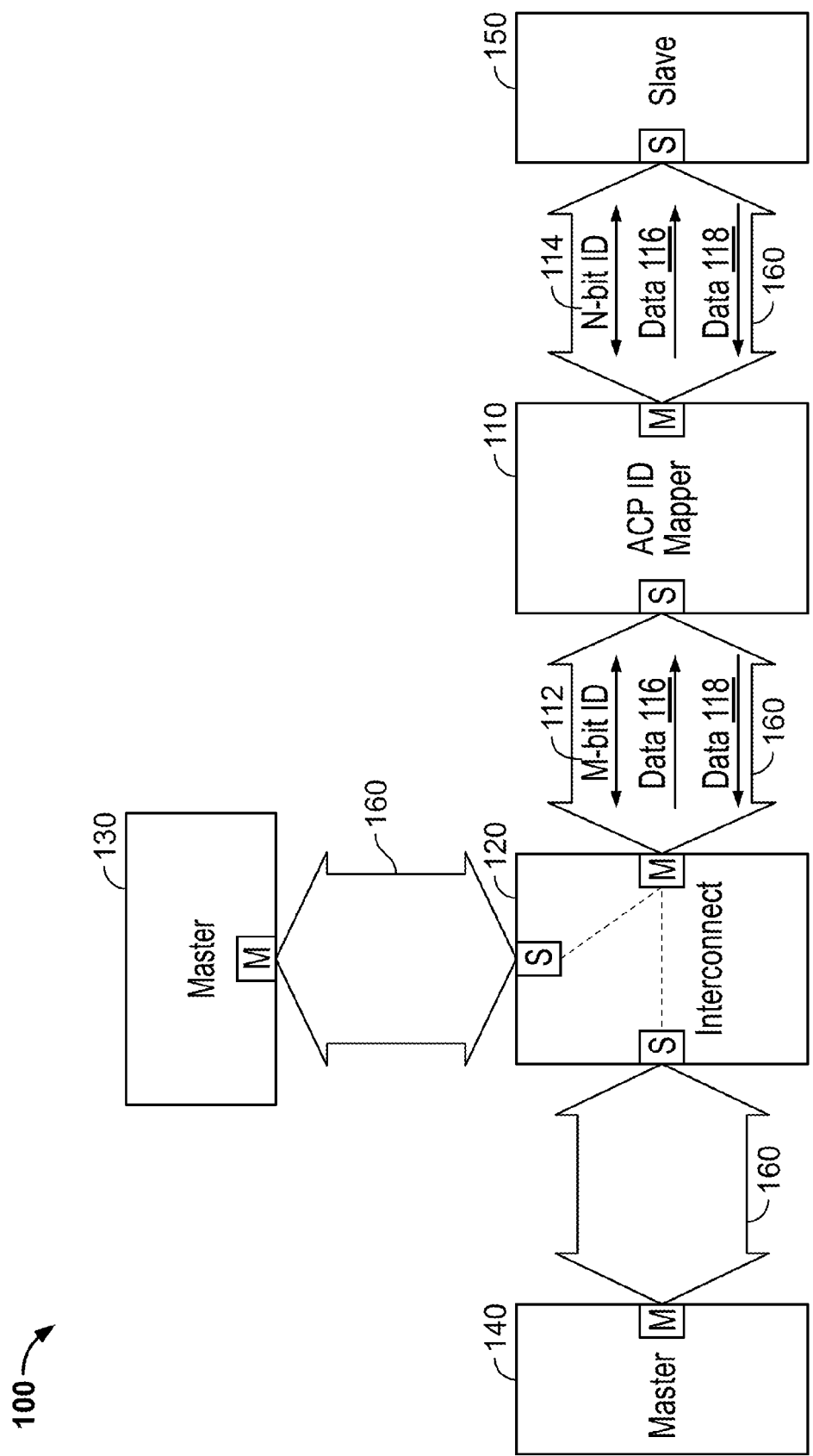
FIG. 1 shows an illustrative system used for AXI ID compression, in accordance with some embodiments of the present disclosure.

FIG. 1 shows an illustrative system used for AXI ID compression, in accordance with some embodiments of the present disclosure. System 100 includes an ID mapper 110, a hardware interconnect 120, masters 130 and 140, a slave 150, and a bus 160. System 100 may use interconnect 120 and ID mapper 110 to manage bus transactions between masters 130 and 140 and slave 150.

Masters 130 and 140 are hardware master devices connected to system 100. Masters 130 and 140 each may be allocated M AXI ID bits by system 100. Master 130 and/or 140 may be a processor, a memory module, a hard disk drive, a microcontroller, a network device such as an Ethernet or WiFi adapter, a programmable logic device, a mask programmable logic device, a specialized processing block, an integrated circuit (IC) device, or any other suitable device. In some embodiments, master 130 and/or 140 may be implemented on a PLD, a Field Programmable Gate Array (FPGA), an integrated circuit (IC), an application specific integrated circuit (ASIC), an application specific standard product (ASSP) or other programmable device.

Slave 150 is a hardware slave device connected to system 100. Slave 150 may be allocated N AXI ID bits by the system 100, where N may be less than M. Slave 150 may be any of the same types of devices as a master, described above. For example, slave 150 may be a processor, a memory module, a hard disk drive, a microcontroller, a network device such as an Ethernet or WiFi adapter, a programmable logic device, a mask programmable logic device, a specialized processing block, an integrated circuit (IC) device, or any other suitable device. In some embodiments, slave 150 may be implemented on a PLD, a Field Programmable Gate Array (FPGA), an integrated circuit (IC), an application specific integrated circuit (ASIC), an application specific standard product (ASSP) or other programmable device. In some embodiments, slave 150 may be a hard processor sub-system with Dynamic Random Access Memory (DRAM) and an accelerator coherency port (ACP).

In system 100, masters 130 and/or 140 may use bus transactions via bus 160 to communicate with slave 150 to perform various functions, such as reading data from or writing data to slave 150. A bus transaction may be composed of one of more messages passed between a master device and a slave device. For example, a read bus transaction may include a read request sent by master 130 or 140 via bus 160 to slave 150 and requested data sent by slave 150 via bus 160 to master 130 or 140 to fulfill the request. Similarly, a write bus transaction may include a write request sent by master 130 or 140 via bus 160 to slave 150, write data sent by master 130 or 140 via bus 160 to slave 150, and a write acknowledgment sent by slave 150 back via bus 160 to master 130 or 140 indicating that the write operation was successful. Other communication protocols implemented over the bus are possible and would function in a similar way.

Interconnect 120 may provide an interface for masters 130 and/or 140 to communicate with ID mapper 110. Interconnect 120 also may provide arbitration functions for bus transactions initiated by masters 130 and/or 140 in accordance with the AXI protocol. Interconnect 120 may pass to ID mapper 110, bus transaction data 116 and M-bit AXI ID 112 associated with the bus transaction information, transmitted on bus 160 by a master device and received by interconnect 120. Interconnect 120 may also pass back to the master, bus transaction data 118 and M-bit AXI ID 112, received from ID mapper 110 and transmitted by a slave device.

ID mapper 110 compresses AXI IDs by mapping, i.e. assigning, M-bit AXI IDs to N-bit AXI IDs, where N may be less than M. When ID mapper 110 receives bus transaction data 116 and M-bit AXI ID 112 from interconnect 120, ID mapper 110 may map, i.e. assign or allocate, M-bit AXI ID 112 to an N-bit AXI ID 114. ID mapper 110 may pass bus transaction data 116 and N-bit AXI ID 114 to slave 150. As a result, bus transaction data 116 may be passed to slave 150 by ID mapper 110 via bus 160, with N-bit AXI ID 114 in place of M-bit AXI ID 112.

Similarly, when ID mapper 110 receives bus transaction data 118 and N-bit AXI ID 114 from slave 150 via bus 160, ID mapper 110 determines the M-bit AXI ID 112 that was allocated to the N-bit AXI ID 114. ID mapper 110 may pass bus transaction data 118 received from slave 150 and M-bit AXI ID 112 to interconnect 120 via bus 160.

In some embodiments, an AXI ID and the associated bus transaction data is transmitted in parallel, e.g., on separate data wires or buses. In some embodiments, an AXI ID and the associated bus transaction data is transmitted serially, e.g., as part of a data packet or frame.

In some embodiments, system 100 includes a PLD acting as a master device and a hard processor sub-system with DRAM and an accelerator coherency port (ACP) acting as a slave device. The PLD master device may use 13 AXI ID bits (M=13), and the slave device may use 3 AXI ID bits (N=3).

FIG. 1 and the accompanying discussion of system 100 provided above are given as an example only. The principles of the current disclosure may be modified and/or adapted to work with any number of masters and/or any number of slaves. The operation of ID mapper 110 is described in further detail below.

Figure 2:
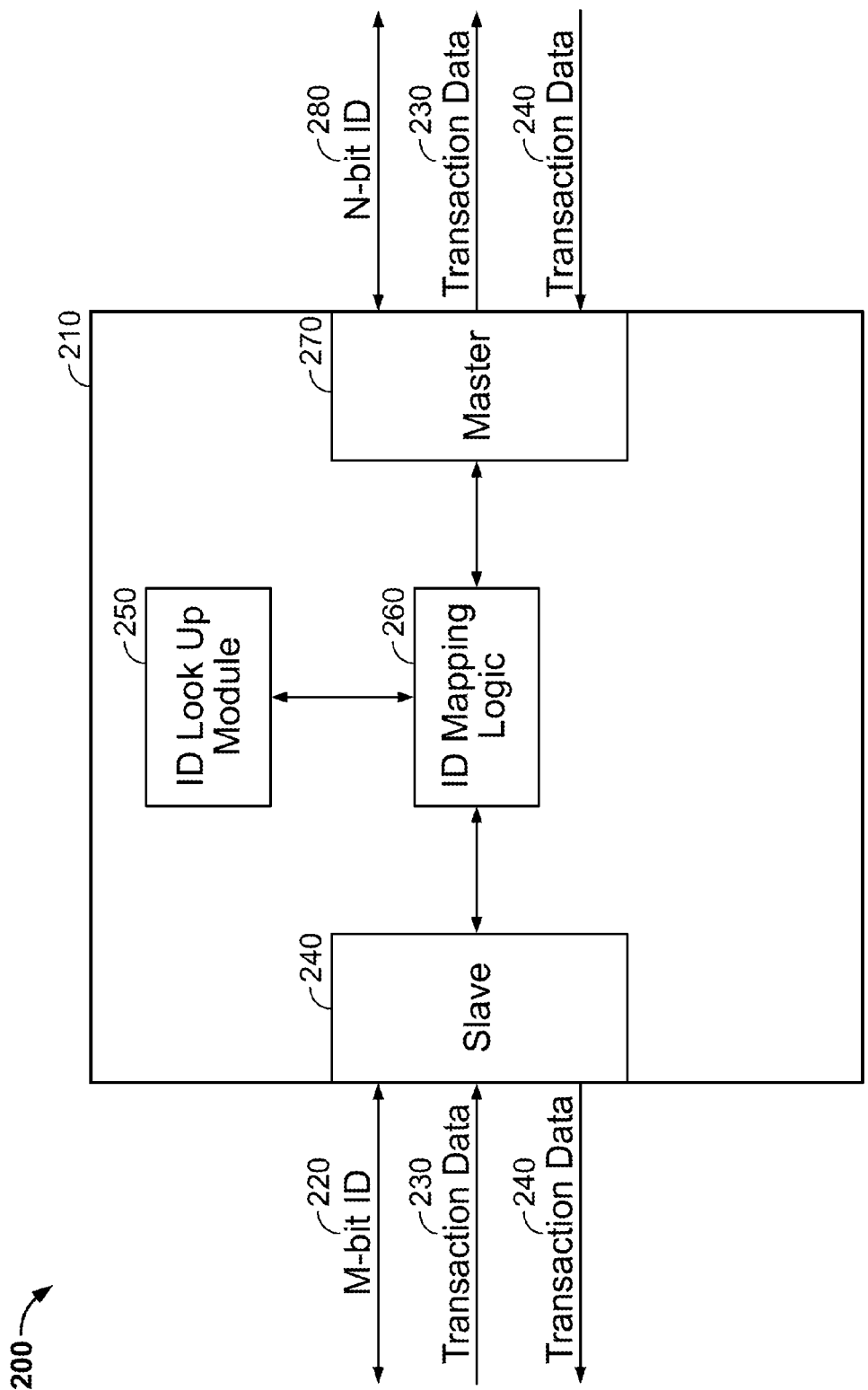
FIG. 2 shows an illustrative ID mapper system, in accordance with some embodiments of the present disclosure.

FIG. 2 shows an illustrative ID mapper system, in accordance with some embodiments of the present disclosure. ID mapper 210 includes a slave port 240, an N-bit ID lookup module 250, ID mapping logic 260, and a master port 270. ID mapper 210 may be similar in form and function to ID mapper 110 of FIG. 1. ID mapper 210 compresses AXI IDs by mapping, i.e. assigning, M-bit AXI IDs to N-bit AXI IDs. ID mapper 210 may use ID lookup module 250 to keep track of the assignments of M-bit AXI IDs to N-bit AXI IDs.

ID lookup module 250 maintains and manages mappings, i.e. assignments or allocations, of M-bit IDs to N-bit IDs used by ID mapper 210. ID lookup module 250 also tracks the status of each N-bit ID that is stored in the ID lookup module 250. The status of an N-bit ID may be either allocated, i.e. assigned, to a particular M-bit ID or unallocated, i.e. unassigned. In some embodiments, ID lookup module 250 may be implemented as a lookup table. The lookup table may contain an entry for each N-bit ID indicating its status. For example, the entry for a particular N-bit ID may be empty, which indicates that the N-bit ID is unallocated, or the entry may contain an M-bit ID value, which indicates that the N-bit ID is allocated to that M-bit ID.

When transaction data 230 associated with an M-bit ID 220 is received on a bus (e.g. bus 160) by ID mapper 210, ID mapping logic 260 may look up M-bit ID 220 in ID lookup module 250.

If there is no N-bit ID that is allocated to the M-bit ID 220, then ID mapping logic 260 may select an unallocated N-bit ID 280 stored in ID lookup module 250 and may allocate it to M-bit ID 220. ID mapping logic 260 may update N-bit ID 280's status in ID lookup module 250 to indicate that N-bit ID 280 is allocated to M-bit ID 220. In some embodiments, for example, the ID mapping logic 260 selects the first N-bit ID stored in ID lookup module 250 that has an empty entry and changes the entry to be M-bit ID 220.

ID mapping logic 260 may associate N-bit ID 280 with transaction data 230 and may transmit both N-bit ID 280 and transaction data 230 on the bus to a slave.

If ID lookup module 250 reports that there is already an N-bit ID 280 that is allocated to M-bit ID 220, then the ID mapping logic 260 does not need to find an unallocated N-bit ID. For example, the ID mapping logic 260 may find that M-bit 220 has corresponding N-bit ID 280 in ID lookup module 250 (i.e. N-bit ID 280 is allocated to M-bit ID 220). ID mapping logic 260 may associate N-bit ID 280 with transaction data 230 and may transmit both N-bit ID 280 and transaction data 230 on the bus to a slave.

The foregoing process may be reversed when transaction data 240 associated with an N-bit ID 280 is received from the slave device on the bus (e.g. bus 160) by ID mapper 210. For example, ID mapping logic 260 may look up N-bit ID 280 in ID lookup module 250 and may find M-bit ID 220 that corresponds to N-bit ID 280 (i.e. N-bit ID 280 is allocated to M-bit ID 220). ID mapping logic 260 may associate M-bit ID 220 with transaction data 240 and may transmit both M-bit ID 220 and transaction data 240 on the bus to the master device.

In an embodiment, ID lookup module 250 and ID mapping logic 260 may be implemented together as one unit or also in combination with other hardware.

ID mapper 210 may operate in dynamic mode, static mode, or in dynamic/static mode. In dynamic mode, ID mapper 210 dynamically allocates and deallocates N-bit IDs to M-bit IDs on demand as bus transaction data is received by ID mapper 210. The allocation process may select an unallocated N-bit ID randomly or according to a predetermined algorithm. For example, the predetermined algorithm may select the lowest unallocated N-bit ID. When a bus transaction completes, ID mapping logic 210 deallocates, e.g. unassigns, the N-bit ID associated with that transaction to free up the N-bit ID for other transactions. An N-bit ID may only be allocated to one M-bit ID at any given time. Dynamic mode may not require any extra configuration beyond the initial configuration of ID mapper 210.

In static mode, each N-bit ID is statically preassigned to an M-bit ID. In some embodiments, the preassignment of N-bit IDs occurs when ID mapper 210 is manufactured or configured. In some embodiments, the preassignment of N-bit IDs is performed by a user, for example, at the time system 100 is manufactured, configured, or programmed. Static mode ensures that each M-bit ID may always correspond with a particular N-bit ID. Thus, because each master device is typically assigned one or more particular M-bit IDs for use in bus transactions, each master device may permanently correspond with one or more unique N-bit IDs in static mode.

Dynamic/static mode is a combination of dynamic mode and static mode. In dynamic/static mode, some M-bit IDs may be statically preassigned to N-bit IDs as described in the description of static mode above while other M-bit IDs may be mapped to dynamically allocated N-bit IDs as described above. Dynamic/static mode offers a user the flexibility of choosing which M-bit IDs will operate as in dynamic mode, i.e. correspond with dynamically assigned N-bit IDs, and which M-bit IDs will operate as in static mode, i.e. correspond with uniquely preassigned N-bit IDs.

Figure 3:
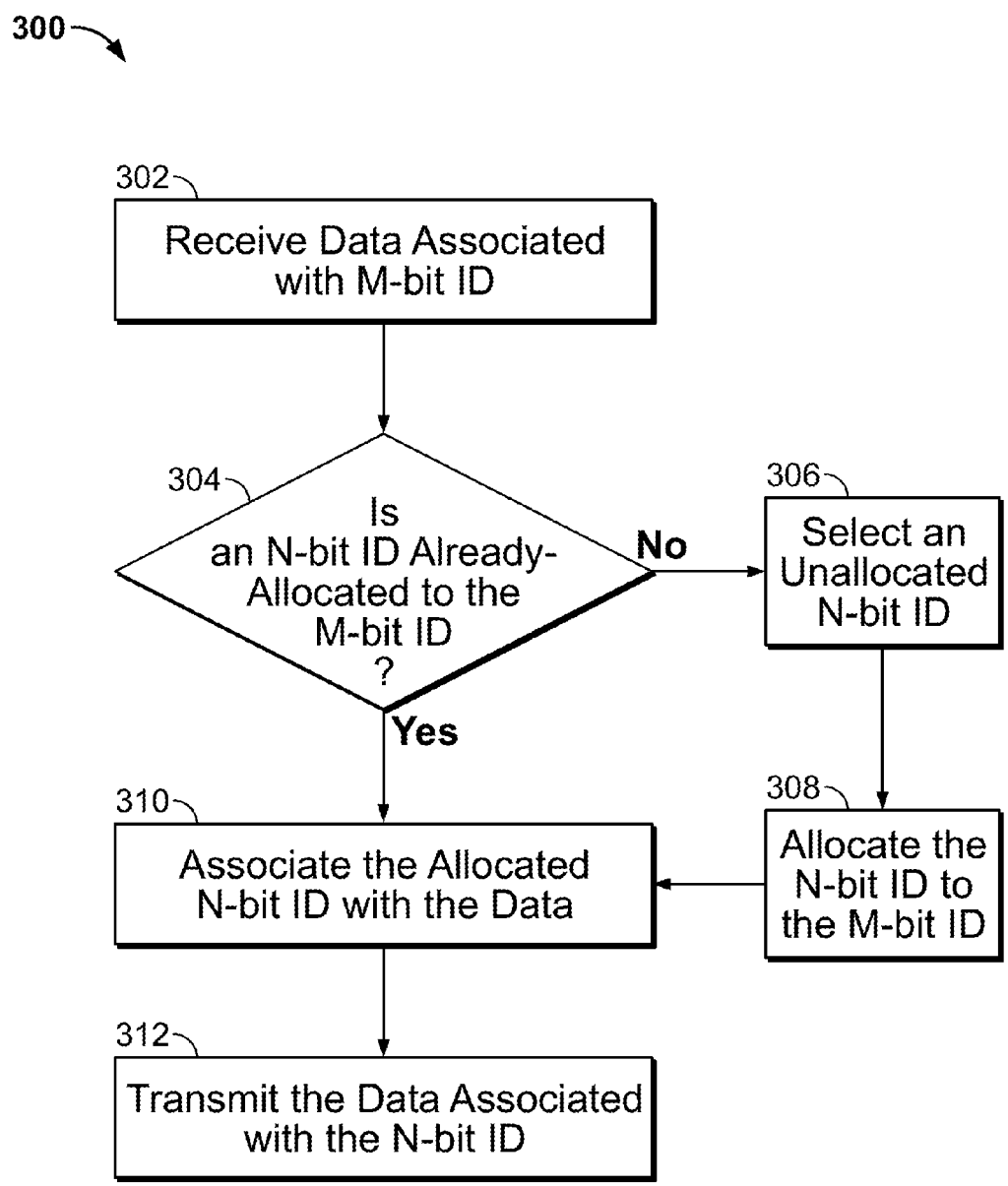
FIG. 3 shows an illustrative flow diagram of a process for dynamic mode AXI ID compression, in accordance with some embodiments of the present disclosure.

FIG. 3 shows an illustrative flow diagram of a process for dynamic mode AXI ID compression, in accordance with some embodiments of the present disclosure. Flow diagram 300 includes operations 302, 304, 306, 308, 310, and 312. At operation 302, an ID mapper, such as ID mapper 210, may receive transaction data associated with an M-bit ID from an interconnect, such as interconnect 120, via a bus, e.g. bus 160.

At operation 304, the ID mapper may determine whether there is an N-bit ID already allocated to the M-bit ID. For example, the ID mapper may search in an ID lookup module such as ID lookup module 250 and may determine whether there is an N-bit ID already allocated to the M-bit ID.

If there is no N-bit ID already allocated to the M-bit ID, then at operation 306, an unallocated N-bit ID may be selected.

At operation 308, the selected N-bit ID may be allocated to the M-bit ID.

If there is an N-bit ID already allocated to the M-bit ID, or after an unallocated N-bit ID is selected and allocated to the M-bit ID, then at operation 310, the N-bit ID may be associated with the transaction data.

At operation 312, the ID mapper may transmit the data and the associated N-bit ID via the bus to slave 150.

The operations of flow diagram 300 may be modified to process transaction data associated with an N-bit ID that is received via the bus from a slave device, such as slave 150. In particular, at operation 302, the ID mapper may receive transaction data associated with an N-bit ID from the slave device via the bus.

At operation 304, the ID mapper may search in the ID lookup module to find the M-bit ID that corresponds to the N-bit ID, i.e. the M-bit ID to which the N-bit ID is allocated. Operations 306 and 308 may be skipped.

At operation 310, the M-bit ID may be associated with the transaction data.

At operation 312, the ID mapper may transmit the data and the associated M-bit ID via the bus to the interconnect. Thus, one of skill in the art will understand how to adapt flow diagram 300 to perform the reverse mapping of N-bit ID to M-bit ID.

Flow diagram 300 is merely illustrative. Any operations in flow diagram 300 may be modified (e.g., performed in a different order, in series, or in parallel), combined, or removed, and any additional operations may be added to flowchart 300, without departing from the scope of the present disclosure.

Figure 4:
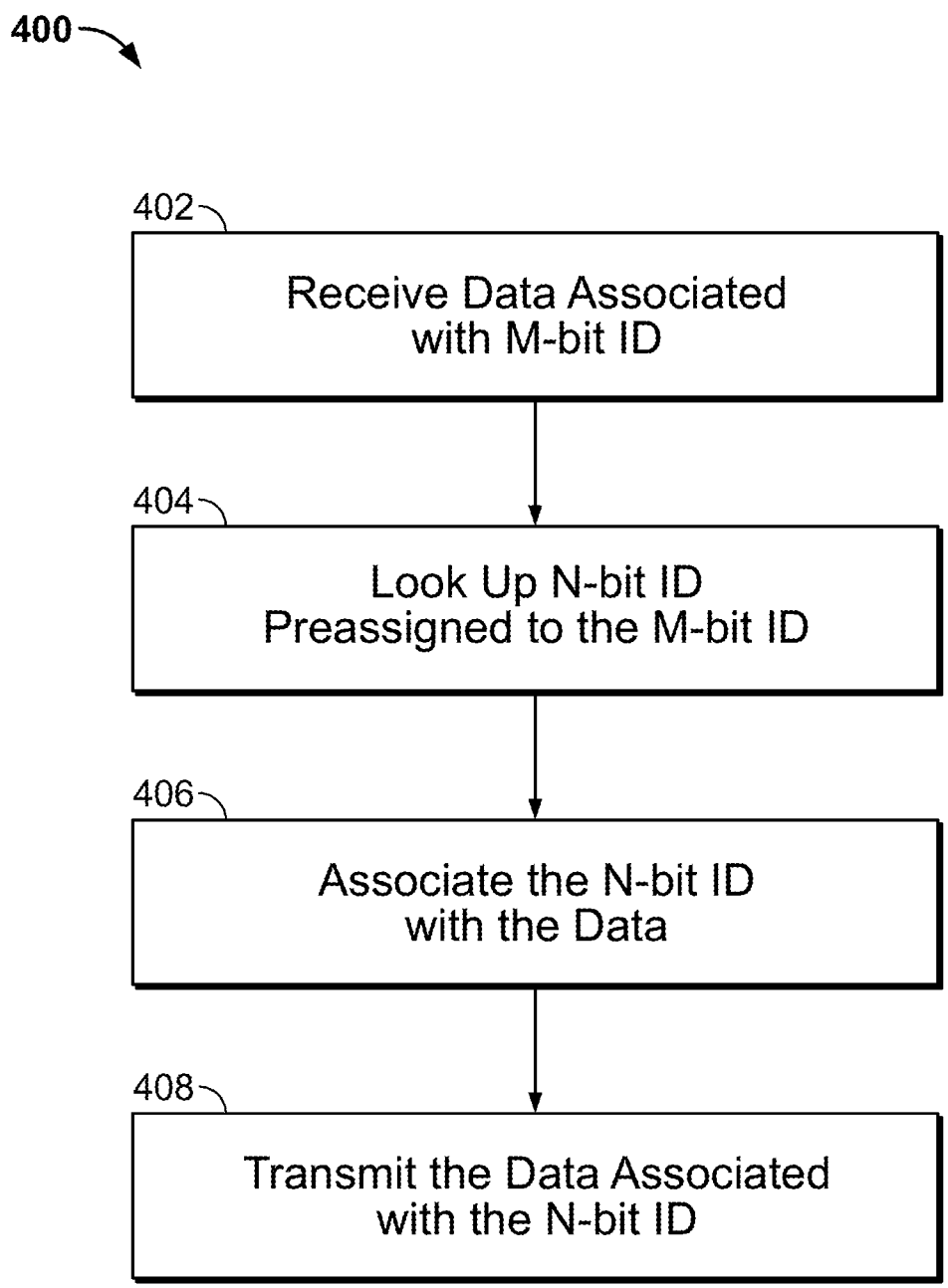
FIG. 4 shows an illustrative flow diagram of a process for static mode AXI ID compression, in accordance with some embodiments of the present disclosure.

FIG. 4 shows an illustrative flow diagram of a process for static mode AXI ID compression, in accordance with some embodiments of the present disclosure. Flow diagram 400 includes operations 402, 404, 406, and 408. At operation 402, an ID mapper, such as ID mapper 210, may receive transaction data associated with an M-bit ID from an interconnect, such as interconnect 120, via a bus, e.g. bus 160.

At operation 404, the ID mapper may determine the N-bit ID that is preassigned to the M-bit ID. For example, the preassignments of N-bit IDs to M-bit IDs in static mode may be stored and maintained in an ID lookup module such as ID lookup module 250. The ID mapper may search in the ID lookup module and may find the N-bit ID preassigned to the M-bit ID.

At operation 406, the ID mapper may associate the N-bit ID with the transaction data.

At operation 408, the ID mapper may transmit the transaction data and the associated N-bit ID via the bus to a slave device, such as slave 150.

The operations of flow diagram 400 may be modified to process transaction data associated with an N-bit ID that is received via the bus from a slave device, such as slave 150. At operation 402, the ID mapper may receive transaction data associated with an M-bit ID from the slave device via the bus.

At operation 404, the ID mapper may determine the M-bit ID to which the N-bit ID is preassigned. For example, the ID mapper may search in the ID lookup module.

At operation 406, the ID mapper may associate the M-bit ID with the transaction data.

At operation 408, the ID mapper may transmit the transaction data and the associated M-bit ID via the bus to the interconnect. Thus, one of skill in the art will understand how to adapt flowchart 400 to perform the reverse mapping of N-bit ID to M-bit ID.

Flow diagram 400 is merely illustrative. Any operations in flow diagram 400 may be modified (e.g., performed in a different order, in series, or in parallel), combined, or removed, and any additional operations may be added to flow diagram 400, without departing from the scope of the present disclosure.

As mentioned previously, one example of a bus transaction is a read bus transaction. In such a transaction, a master device may generate read request data. The read request data may instruct a slave device to read specific data from a memory and transmit the specific data to the master device. The master device may associate the read request data with an M-bit ID and transmit to an interconnect (e.g. interconnect 120) via a bus (e.g. bus 160) the read request data and the M-bit ID. The interconnect may transmit the read request data and the M-bit ID to an ID mapper via the bus.

The ID mapper may map the M-bit ID to an N-bit ID as described in detail above. The ID mapper may associate the N-bit ID with the read request data and transmit both the read request data and the associated N-bit ID via the bus to a slave device, such as slave 150.

The slave device may process the read request data. In response to the read request, the slave device may read the requested data from the memory. The slave device may associate the N-bit ID with read response data. The slave device may transmit back to the ID mapper the read response data and the associated N-bit ID via the bus.

The ID mapper may map the N-bit ID to the M-bit ID as described above. The ID Mapper may associate the M-bit ID with the read response data and transmit both read response data and the M-bit ID to the master device via the interconnect and the bus.

Another example of a bus transaction is a write bus transaction. In such a transaction, a master device may generate write request data and write data. The write request data may instruct a slave device to receive write data from the master device and to write the write data to a memory. The write data may encode the data to be written to the memory.

The master device may associate an M-bit ID with the write request data and also associate the same M-bit ID with the write data.

The master device may transmit to an ID mapper via an interconnect (e.g. interconnect 120) and via a bus (e.g. bus 160) the write request data and the M-bit ID. The master device may also transmit to the ID mapper the write data and the M-bit ID. The write request data and the write data may arrive at the ID mapper in a difference order than the order they were transmitted.

For both the write request data and the write data, the ID mapper may map the M-bit ID to an N-bit ID as described in detail above. The ID mapper may associate the N-bit ID with the write request data and transmit both the write request data and the N-bit ID via the bus to a slave device, such as slave 150. The ID mapper may also associate the N-bit ID with the write data and transmit both the write request data and the N-bit ID via the bus to a slave device.

The slave device may process the write request data and the write data. In response to the write request, the slave device may write the write data to the memory. The slave device may associate the N-bit ID with write acknowledgment data. The slave device may transmit back to the ID mapper the write acknowledgment data and the associated N-bit ID via the bus.

The ID mapper may map the N-bit ID to the M-bit ID as described above. The ID Mapper may associate the M-bit ID with the write acknowledgment data and transmit both write acknowledgment data and the M-bit ID to the master device via the interconnect and the bus.

As described above, the flow diagrams 300 and 400 may be combined for an ID mapper operating in dynamic/static mode. In dynamic/static mode, some N-bit IDs are statically preassigned to M-bit IDs while other N-bit IDs that are not preassigned may be allocated dynamically. In an embodiment, a user may configure the ID mapper so that a specific set of M-bit IDs have statically preassigned N-bit IDs, and that any M-bit ID not within that specific set will instead receive dynamic allocations of N-bit IDs.

For example, an ID mapper may contain an ID lookup module implemented as a lookup table containing the assignments or allocations of N-bit IDs to M-bit IDs. An M-bit ID in the lookup table may have a corresponding entry. An M-bit ID that has a statically preassigned N-bit ID may have a corresponding entry indicating the N-bit ID value, and the entry is marked to indicate that it is statically allocated (e.g. marked with a bit value). An M-bit ID that uses dynamic allocations may have a corresponding entry that is marked to indicate that it is dynamically allocated (e.g. marked with a bit value). Thus, the ID mapper may search in the ID lookup module to determine whether to operate in dynamic or static mode for a particular M-bit ID. One skilled in the art will understand how to combine methods 300 and 400 in a suitable fashion to operate an ID mapper in dynamic/static mode.

Figure 5:
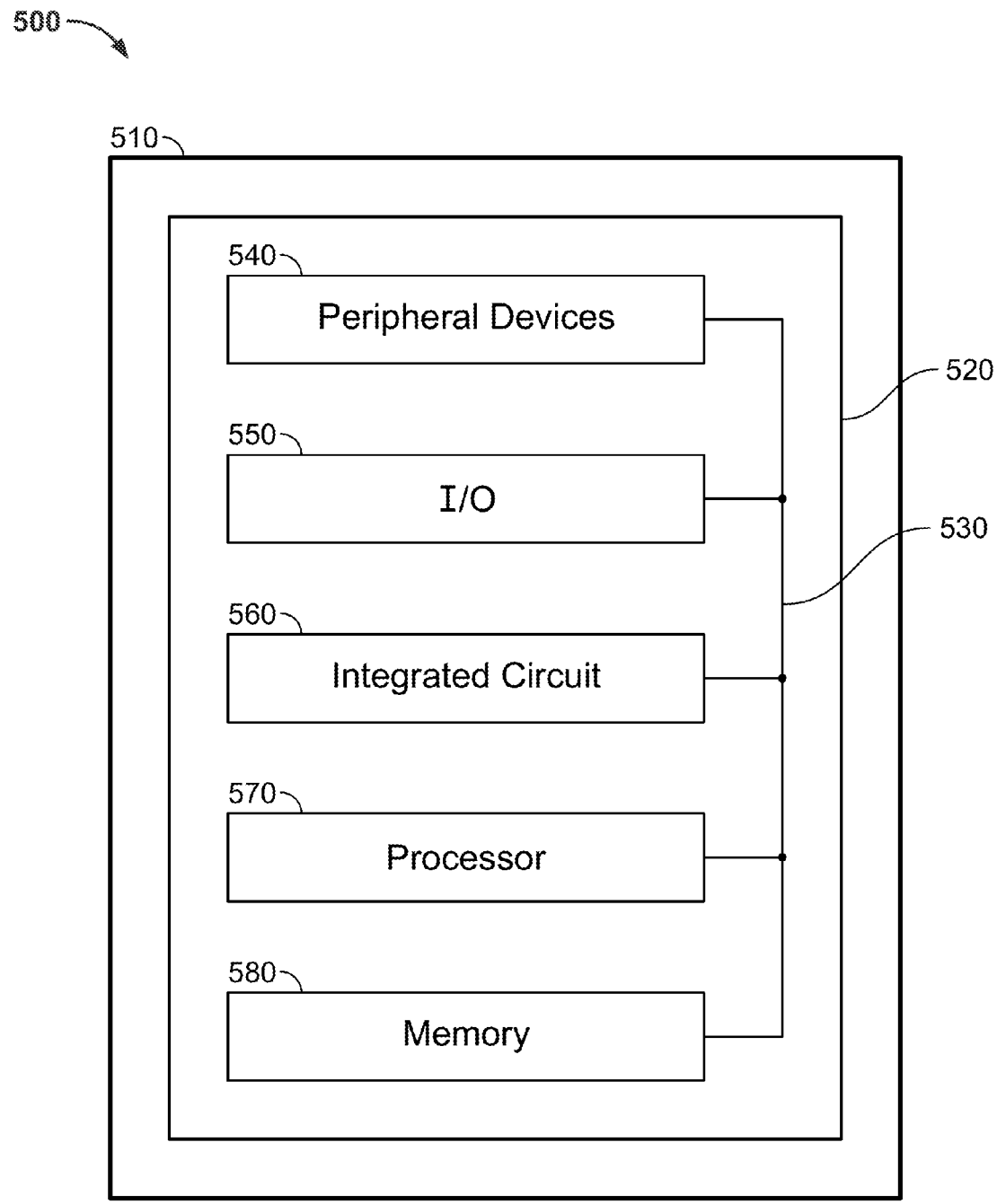
FIG. 5 shows an illustrative system that may be used to implement some embodiments of the present invention.

FIG. 5 illustrates an exemplary system 500 which includes embodiments of the present invention within a data processing system 500. System 500 may be or may include a circuit or other device (e.g., integrated circuit, application specific standard product (ASSP), application specific integrated circuit (ASIC), programmable logic device (PLD), full-custom chip, dedicated chip), which includes embodiments of the DQS enable/disable calibration and tracking circuits described herein as being within a data processing system 500. In an embodiment, circuit 560 may include one or more of the components of system 100. Data processing system 500 can include one or more of the following components: a processor 570, memory 580, I/O circuitry 550, an integrated circuit 560, and peripheral devices 540. These components are connected together by a system bus or other interconnections 530 and are populated on a circuit board 520 which is contained in an end-user system 510.

System 500 may be used in a wide variety of applications, such as computer networking, data networking, instrumentation, video processing, digital signal processing, or any other application where the advantage of using programmable or reprogrammable logic is desirable. Circuit 560 may be used to perform a variety of different logic functions. For example, circuit 560 may be configured as a processing block or controller that works in cooperation with processor 570. Circuit 560 may also be used as an arbiter for arbitrating access to a shared resource in system 500. In yet another example, circuit 560 may be configured as an interface between processor 570 and one of the other components in system 500. It should be noted that system 500 is only exemplary, and that the true scope and spirit of the invention should be indicated by the following claims.

The foregoing is merely illustrative of the principles of this invention and various modifications can be made by those skilled in the art without departing from the scope and spirit of the invention. The above described embodiments of the present invention are presented for purposes of illustration and not of limitation, and the present invention is limited only by the claims which follow.

What is claimed is:

1. A method of allocating a first identifier in a plurality of first identifiers to a second identifier associated with a bus transaction between a first device and a second device, the method comprising:

receiving, from the second device, the second identifier and a bus transaction request associated with the second identifier on the bus;

determining whether any of the plurality of first identifiers is already allocated to the second identifier;

selecting, using an ID mapper, one of the plurality of first identifiers, the selected first identifier having a shorter bit length than a bit length of the second identifier, by:

selecting the already allocated first identifier, if any of the plurality of first identifiers is already allocated to the second identifier, and selecting an unallocated first identifier in the plurality of first identifiers and allocating the selected first identifier to the second identifier, if any of the plurality of first identifiers is not already allocated to the second identifier;

associating, using the ID mapper, the first identifier with the bus transaction request;

transmitting the bus transaction request and the first identifier to the first device;

receiving, from the first device, bus transaction data in response to the bus transaction request;

associating, using the ID mapper, the second identifier with the bus transaction data corresponding to the bus transaction request; and transmitting the bus transaction data and the second identifier to the second device.

2. The method of claim 1, wherein:
the first identifier is an N-bit identifier;
the second identifier is an M-bit identifier; and
N is less than M.

3. The method of claim 1, wherein the bus is configured to operate using the Advanced Extensible Interface (AXI) protocol.

4. The method of claim 1, wherein the selecting further comprises selecting, based on the second identifier, the first identifier from the plurality of first identifiers, wherein the first identifier is preassigned to the second identifier.

5. A system for allocating a first identifier in a plurality of first identifiers to a second identifier associated with a read bus transaction between a first device and a second device, the read bus transaction comprising a read request and read data, the system comprising:

a bus; and
an ID mapper configured to:
receive, from the second device, the read request associated with the second identifier on the bus;
determine whether any of the plurality of first identifiers is already allocated to the second identifier;
select, based on the second identifier, one of the plurality of first identifiers, the selected first identifier having a shorter bit length than a bit length of the second identifier, by:
selecting the already allocated first identifier, if any of the plurality of first identifiers is already allocated to the second identifier, and
selecting an unallocated first identifier in the plurality of first identifiers and allocating the selected first identifier to the second identifier, if any of the plurality of first identifiers is not already allocated to the second identifier;
associate the first identifier with the read request;
transmit the read request and the first identifier to the first device;
receive, from the first device, the read data in response to the read request on the bus;
associate the second identifier with the read data; and
transmit the read data and the second identifier to the second device.

6. The system of claim 5, wherein:
the first identifier is an N-bit identifier;
the second identifier is an M-bit identifier; and
N is less than M.

7. The system of claim 5, wherein the bus is configured to operate the Advanced Extensible Interface (AXI) protocol.

8. The system of claim 5, wherein the ID mapper is further configured to select, based on the second identifier, the first identifier from the plurality of first identifiers, wherein the first identifier is preassigned to the second identifier.

9. The system of claim 5, further comprising an AXI master device configured to send the read request and receive the read data on the bus.

10. A system for allocating a first identifier in a plurality of first identifiers to a second identifier associated with a write bus transaction between a first device and a second device, the write bus transaction comprising a write request, write data, and a write acknowledgment, the system comprising:

a bus; and
an ID mapper configured to:
receive, from the second device, the write request on the bus;
determine whether any of the plurality of first identifiers is already allocated to the second identifier;
select, based on the second identifier, the first identifier from the plurality of first identifiers, the first identifier having a shorter bit length than a bit length of the second identifier, by:
selecting the already allocated first identifier, if any of the plurality of first identifiers is already allocated to the second identifier, and
selecting an unallocated first identifier in the plurality of first identifiers and allocating the selected first identifier to the second identifier, if any of the plurality of first identifiers is not already allocated to the second identifier;
associate the first identifier with the write request;
transmit the write request and the first identifier to the first device;
receive, from the first device, the write data on the bus;
associate the second identifier with the write data; and
transmit the write data and the second identifier to the second device.

11. The system of claim 10, wherein the bus is configured to operate the Advanced Extensible Interface (AXI) protocol.

12. The system of claim 10, wherein the ID mapper is further configured to select, based on the second identifier, the first identifier from the plurality of first identifiers, wherein the first identifier is preassigned to the second identifier.

13. The system of claim 10, further comprising an AXI master device configured to send the read request and receive the read data on the bus.

14. The system of claim 10, wherein the ID mapper is further configured to:
receive the write acknowledgment on the bus, and
associate the second identifier with the write acknowledgment.

15. The method of claim 1, wherein the first identifier and the bus transaction data are received together from the first device.

16. The method of claim 1, wherein the selecting the first identifier comprises using a look-up table to map the second identifier to the first identifier.

17. The method of claim 1, wherein the associating the second identifier with the bus transaction data comprises using a look-up table to map the first identifier to the second identifier.

* * * * *